United States Patent

Kasbarian et al.

[11] Patent Number: 6,081,123
[45] Date of Patent: Jun. 27, 2000

[54] DEVICE FOR PREVENTIVE DETECTION OF FAULTS WITH IDENTIFICATION OF THE TYPE OF LOAD

[75] Inventors: Jean-Marc Kasbarian, Marseille; Simon Tian, Grenoble; Pascal Hanchin, Rueil Malmaison; Christine Clausse, Paris, all of France

[73] Assignee: Schneider Electric SA, France

[21] Appl. No.: 08/957,679

[22] Filed: Oct. 24, 1997

[30] Foreign Application Priority Data

Nov. 18, 1996 [FR] France .................................. 96 14337

[51] Int. Cl.[7] .............................. G01R 31/08; H02H 3/00
[52] U.S. Cl. .............................................. 324/521; 361/59
[58] Field of Search .................................... 324/520, 521, 324/522, 525; 702/57, 60, 64, 65, 66, 71, 73, 59, 72; 361/59, 115

[56] References Cited

U.S. PATENT DOCUMENTS

| | | | |
|---|---|---|---|
| 4,362,986 | 12/1982 | Burke et al. | 324/51 |
| 4,857,826 | 8/1989 | Graham | 324/508 |
| 5,448,492 | 9/1995 | Kolomyski et al. | 364/483 |
| 5,561,376 | 10/1996 | Moore et al. | 324/713 |
| 5,839,093 | 11/1998 | Novosel et al. | 702/59 |
| 5,910,875 | 6/1999 | Tian et al. | 361/78 |

FOREIGN PATENT DOCUMENTS

| | | |
|---|---|---|
| 0581078 | 2/1994 | European Pat. Off. . |
| 95/06349 | 3/1995 | WIPO . |

OTHER PUBLICATIONS

8078 Proceedings of the IEEE, Dec. 1992, No. 12, "Non-instrusive Appliance Load Monitoring," by George W. Hart, pp. 1870–1891.

IBM Technical Disclosure Bulletin, Apr. 1976, vol. 18, No. 11, "Skipping Chopper Cycles in Switching Regulator," by R. Yeager, pp. 3737–3738.

*Primary Examiner*—Josie Ballato
*Assistant Examiner*—Russell M. Kobert
*Attorney, Agent, or Firm*—Parkhurst & Wendel, L.L.P.

[57] ABSTRACT

During a first test phase, the device, after detecting the presence of a load, enables the nature of the load to be identified. For this, a control circuit connects the load to an AC main power system, while limiting the current in the load. The device measures several tens of samples of instantaneous values of the load voltage and current during a limited number of half-waves of an AC sine signal and determines the load impedance and the current/voltage phase shift. These characteristics, possibly with complementary parameters derived from the voltage and current measurements, enable the nature of the load to be identified. During a second test phase, the control circuit applies pulses limited in voltage to the load and detects possible short-circuit, differential or overload faults.

18 Claims, 12 Drawing Sheets

DEVICE FOR PREVENTIVE DETECTION OF FAULTS WITH IDENTIFICATION OF THE TYPE OF LOAD

BACKGROUND OF THE INVENTION

The invention relates to a device for preventive detection of faults in a load connected to an AC electrical power supply system by means of a switching means comprising a first switch, a device comprising control means for the switching means, the control means comprising means for identifying the type of load, means for detecting faults with test means to temporarily connect the load to test power supply means, and means for measuring the current in the load.

A known device (EP-A-581,078) comprises an optic circuit for detection of connection of a plug in a socket connected to an electrical power system. It then performs fault detection by measuring the current in the load when the latter is supplied under low power, either by a pulse generator or by the electrical power system via a step-down transformer. This document indicates that it is possible to detect the type of load, and more particularly the fact that the load is purely dissipating or not, from measurement of the current when the test power supply in constituted by a pulse generator. It does not, however, provide any details on how this detection is performed. In practice, the device described does not really enable the nature of the load to be identified and fault detection is not adapted to the type of load.

SUMMARY OF THE INVENTION

The object of the invention in to achieve a device enabling an identification of the nature of the load, so as to enable satisfactory preventive fault detection for all types of application, notably for non-linear loads.

The object is achieve by the switching means comprising a first means for connecting the load to the main electrical power system and a second means for connecting the load to the main system via a limiting impedance of high value. The control means comprises means for actuating the second connecting means during a first test phase, and means for measuring the output of voltage of the device. The means for identifying the type of load comprises means for measuring a predetermined number of values or samples of the instantaneous current and voltage in the load during a limited number of half-waves of an alternating power from the main system voltage. The pre-determined number of sample being about a few tens of values per half-wave. The means for identifying the type of load comprises means for determining the current/voltage phase shift in the load and calculating the load impedance, from the measured instantaneous currents and voltages, and, means for comparing the phase shift and impedance with pro-determined values representative of different types of load.

According to a development of the invention, the means for identifying the type of load comprises means for determining, from the measured instantaneous voltages and currents, complementary electrical parameters of the load, and means for comparing the complementary parameters with pre-determined values representative of different types of load.

The complementary parameters can be chosen from among the active power, the reactive power, the mean current and/or voltage values, the harmonic coefficients, the dissymmetry factors at the level of the half-wave, the evolution of the voltage in the course of the first half-waves, the form of the voltage, and the number of times the current and/or voltage passes zero.

Analysis of the current and voltage waves during this first test phase, in the course of which the current flowing in the downline electrical circuit formed by the load in limited by the high serial impedance to a low current value for safety reasons, enables the nature of the load to be identified.

According to a preferred embodiment, the device comprises an electronic switch and, during a second test phases, the control means temporarily close the electronic switch to apply the AC voltage of the main system to the load during a limited period of the main system's voltage cycle, so that the instantaneous voltage applied to the load remains, during the second test phase, lower than a pre-determined peak voltage and much lower than the peak voltage of the main system.

When the type of load detected is a resistive load, the means for identifying the type of load, can comprise means for determining the load impedance during the second test phase and moans for a detailed identification of the nature of the resistive load.

The means for detecting faults preferably comprise means for detecting a short-circuit comprising moans for comparing the current measured in the load during the second test phase with a pre-determined current threshold, and means for indicating a short-circuit, if the current measured exceeds a current threshold, as well as differential means for detecting faults comprising means for measuring the differential current with a pro-determined differential current threshold, and means for signaling a differential fault, if the measured differential current exceeds the differential current threshold.

According to another development of the invention, the means for detecting faults comprise means for detecting an overload comprising means for estimating the nominal power of the load adapted to the type of load detected, means for comparing the estimated nominal power with a pre-determined power threshold representative of the power available on an output of the device, and means for signaling an overload if the estimate nominal power exceeds the power threshold.

Overload detection is thus correlated to the type of load detected. For a non-linear load, the behavior of the load in transient conditions, or cold, is not representative of its permanent behavior under rated voltage. However, for a given load type, it is possible to estimate the nominal behavior of the load, from determination of the transient, or cold, characteristics of the load, performed by means of measurements made during a tout period. The possible presence of a fault due to an overload can then be detected from the estimated nominal behavior.

According to another development of the invention, the device comprises means for detecting the presence of a load during the first test period, said means comprising means for comparing the output voltage with a pre-determined voltage threshold, the control means performing identification of the type of load and fault detection when the output voltage is less than or equal to said voltage threshold.

BRIEF DESCRIPTION OF THE DRAWINGS

Other advantages and features will become more clearly apparent from the following description of different embodiments of the invention given as non-restrictive examples only and represented in the accompanying drawings in which.

DETAILED DESCRIPTION OF THE PREFERRED EMBODIMENT

Figure 1:
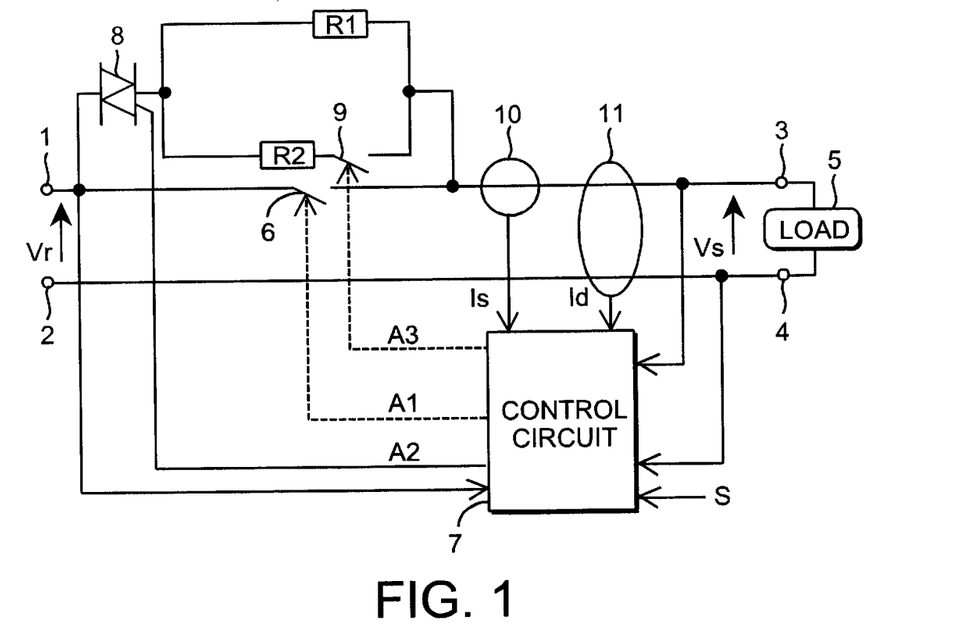
FIG. 1 represents, in block diagram form, a particular embodiment of a device, according to the invention.

As represented in FIG. 1, the device, according to the invention, comprises two input terminals 1 and 2, connected to an AC electrical main power supply system. The voltage Vr of the main power system in therefore applied between the terminals 1 and 2. The device comprises two output terminals, 3 and 4, between which a load 5 can be connected. The terminals 2 and 4 are connected directly to one another, whereas the terminals 1 and 3 are connected by means of a switching circuit.

In the particular embodiment represented in FIG. 1, the switching circuit comprises a first switch 6, arranged between the terminals 1 and 3 and controlled by output signals A1 of a control circuit 7. A second switch 8 is connected in series with a limiting impedance formed by a limiting resistor R1, of high value, between the terminals 1 and 3. In the particular embodiment of FIG. 1, the second switch 8 is an electronic switch formed by a triac, receiving on a control electrode, control signals A2 supplied by the control circuit 7. A third switch 9 is connected, in series with a protective resistor R2 of low value, in parallel with the resistor R1. The switch 9 is controlled by output signals A3 of the control circuit 7. It can be formed by an electronic switch, for example, an opto-triac or by a contact of a low-current mechanical relay.

The device comprises a circuit for measurement of the output current Is, for example, formed by a toroid 10 connected upline from the output terminal 3. The toroid 10 supplies signals representative of the current Is to the control circuit 7. The output voltage Vs of the device, measured between the output terminals 3 and 4, is also applied to inputs of the control circuit 7. When a load 5 is connected to the outputs 3 and 4, the voltage Vs is representative of the voltage at the terminals of the load and the current Is is the current flowing in the load.

In FIG. 1, a circuit for measurement of the residual differential current, formed by a differential toroid 11 surrounding the two conductors arranged upline from the output terminals 3 and 4, supplies signals to the control circuit 7 representative of the differential current Id in the load.

The device for preventive fault detection, with identification of the type of load, can be integrated into any type of interface which is fitted between an electrical power distribution system and an electrical circuit constituting the load. or the purpose of providing examples, it can be integrated in a circuit breaker, a contactor, a speed variator, or in a controllable electrical socket. In the case of a circuit breaker, each manual or automatic closing of the circuit breaker causes an initialization signal S to be applied to the control circuit 7. In the case of a socket, it is the plugging-in of a plug, able to connect a wide diversity of loads, which causes the initialization signal S to be applied to the control circuit 7. As an example, the signal S can be produced by an optic presence detection circuit of the type described in the above-mentioned document EP-A-58,078.

Figure 2:
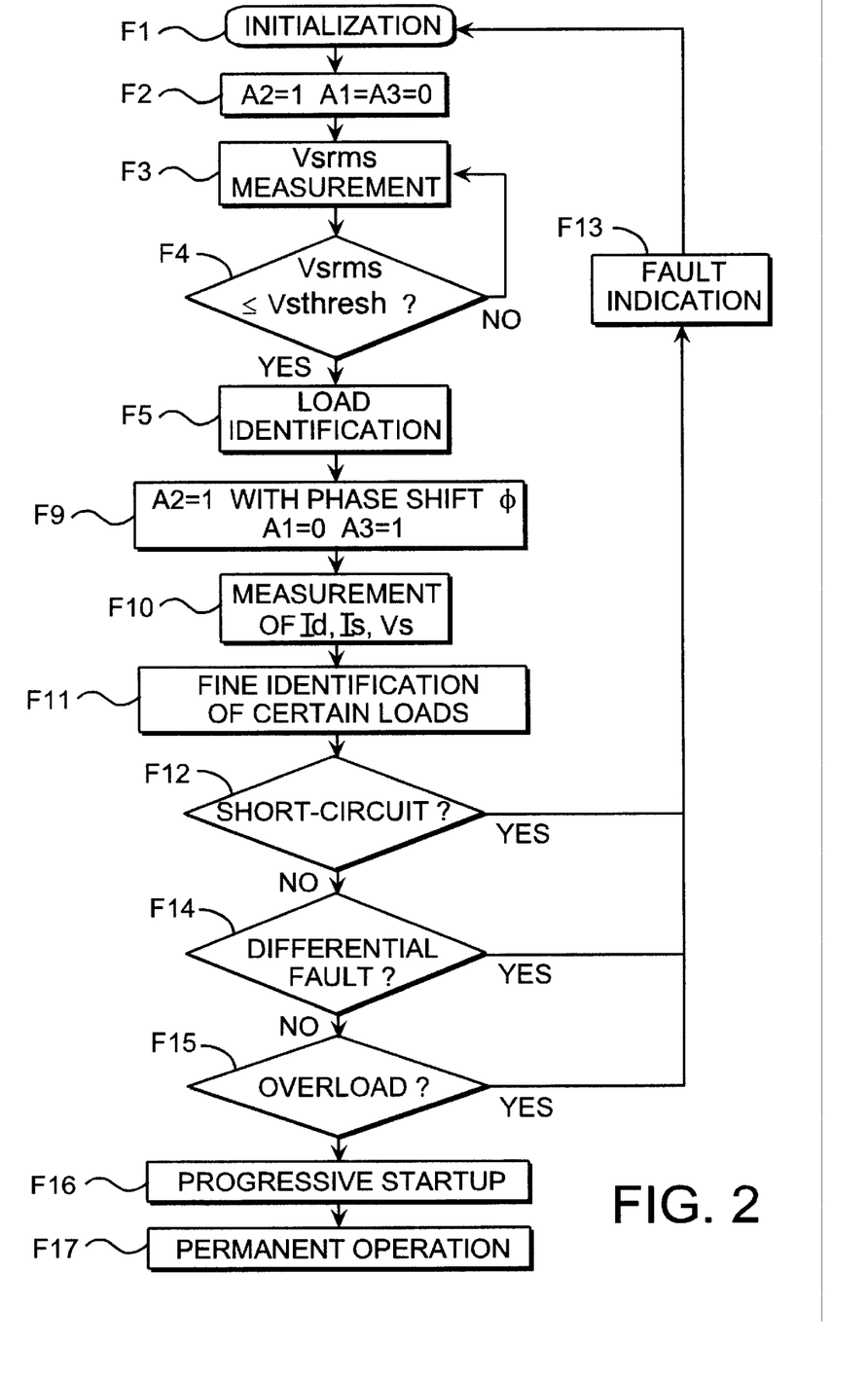
FIG. 2 represents a particular embodiment of a flowchart of operation of the control circuit of the devices, according to FIG. 1.
Figure 3:
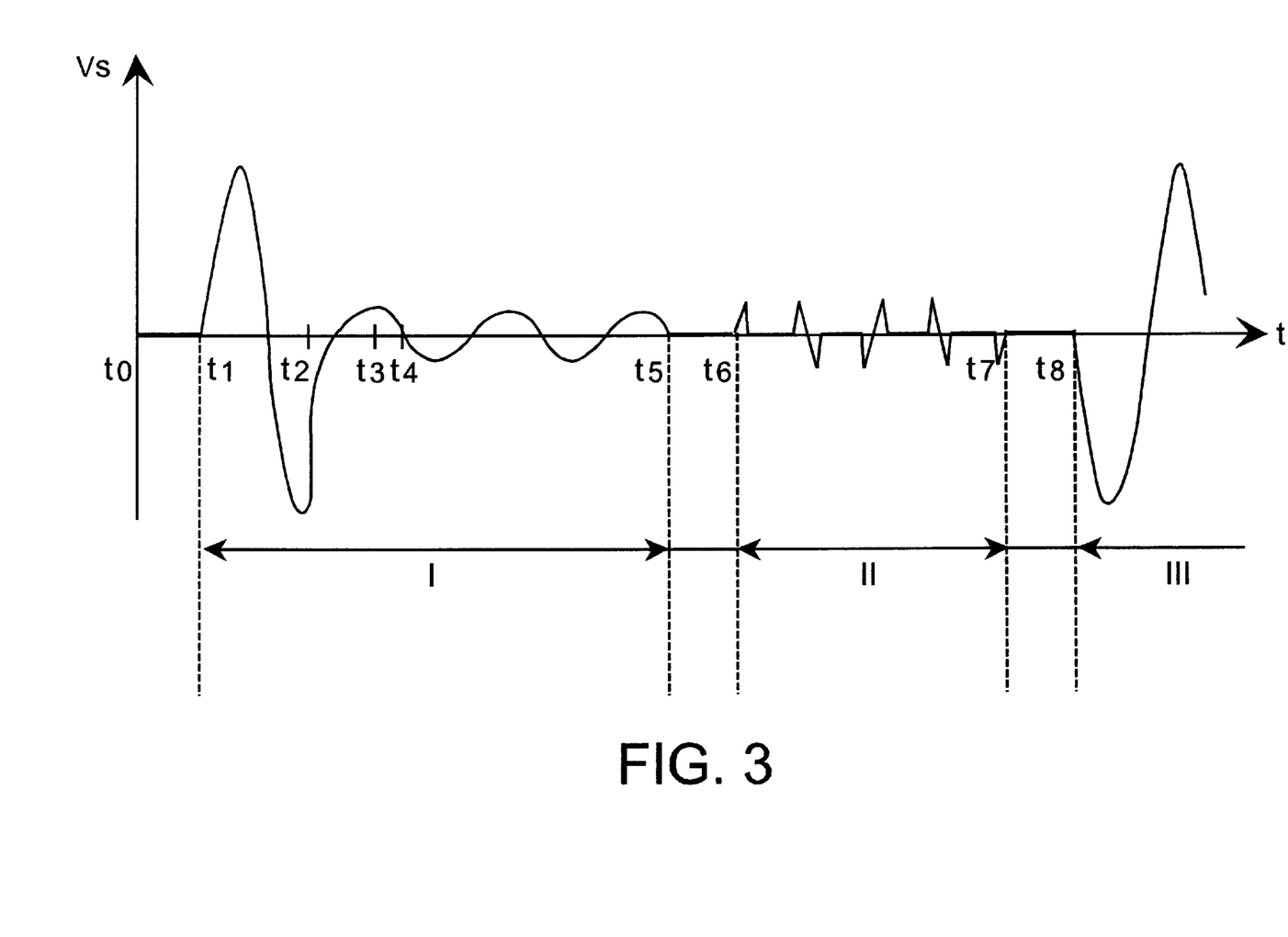
FIG. 3 illustrates the wave forms of the output voltage Vs of the device.

The operation of the device, according to the invention, will be described in greater detail below with respect to the flowchart of FIG. 2 and the wave forms of FIG. 3.

The switches 6, 8, and 9 being open (Vs=0), application of the signal S to the circuit 7 results in an initialization stage (F1) at the time t0. The control circuit 7 then goes on, at t1, to a first test phase I. During the first test phase, the control circuit proceeds (stage F2) with closing of the second switch 8 by applying closing control signals to it (A2=1 in the embodiment represented), while keeping the first and third switches open (A1=0 and A3=0).

Figure 4:
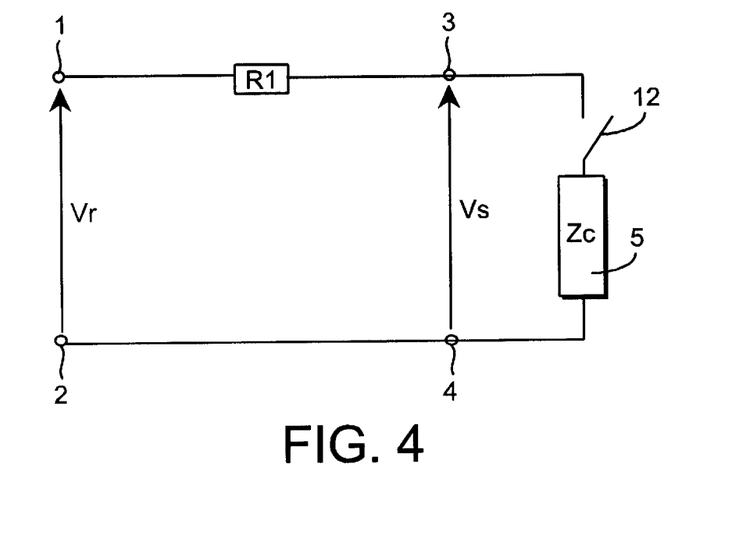
FIG. 4 represents an equivalent wiring diagram of the device, according to the invention, during the load power-on detection phase.

The first test phase begins with a load power-on detection phase. The load 5 can in fact, as represented in FIG. 4, be connected to the output terminals 3 and 4 by a power-on switch 12. So long as this switch is open, the load, although present, is not powered on. To detect powering on, the control circuit 7 measures (F3) the output voltages Vsrms, then compares (stage F4) the measured voltage with a threshold voltage Vsthresh. When Vsrms is lower than or equal to the threshold voltage, the control circuit considers that the load is present and that its power-on is ordered (switch 12 closed). It then goes on (yes output of F4) to a load nature identification phase. On the other hand, so long as Vsrms remains higher than the threshold (no output of F4), the load is not considered an being powered on (switch 12 open) and the control circuit loops back to the stage F3.

The equivalent wiring diagram of FIG. 4 represents the electrical voltages applied to the input and output of the circuit during the first test phase and notably during the load power-on detection phase. The switch 8 being closed, that is to say on, the main power system voltage Vr is applied to the terminals of a circuit comprising, in series, the resistor R1, the switch 12 and the load 5 of impedance Zc. So long as the switch 12 in open (t1–t2), the output voltage Vs is equal to the main power system voltage Vr. The resistor R1 having a high value, the short-circuit current is, in all cases, limited to a low value which is not dangerous. When the load is powered on by closing of the switch, at the time t2, the voltage Vs decreases. This decrease is detected by the control circuit 7 which then goes on to the load nature identification phase (stage F5).

As a non-restrictive example, if Vr=230V and R1=47 kΩ, the rms short-circuit current is limited to about 5 mA and the maximum power dissipated in the resistor is 1.2 W. If it in assumed that all the loads being able to be connected have a power greater than 4 W, i.e., a load resistance lower than or equal to 13.2 kΩ, then the threshold voltage Vsthresh is fixed at:

$$Vsthresh=(230\times13.2)/(47+13.2)=50.5 \text{ V.}$$

Measurement of Vsrms is preferably performed for each quarter of a period. In this way the decrease of Vsrms from the time t2 in detected right from the time t3 and the load nature identification phase can begin as soon as the voltage next passes zero, i.e., at the beginning of the next half-wave, at t4. If the rms value Vsrms of the output voltage is measured over a complete half-wave, in the embodiment of FIG. 3, the load power-on detection phase will end at the time t4 and the next phase will begin only at the next half-wave. The invention is not limited to use of the rms value Vsrms of the output voltage. It in possible to use the mean value or possibly the peak value of the output voltage.

Figure 5:
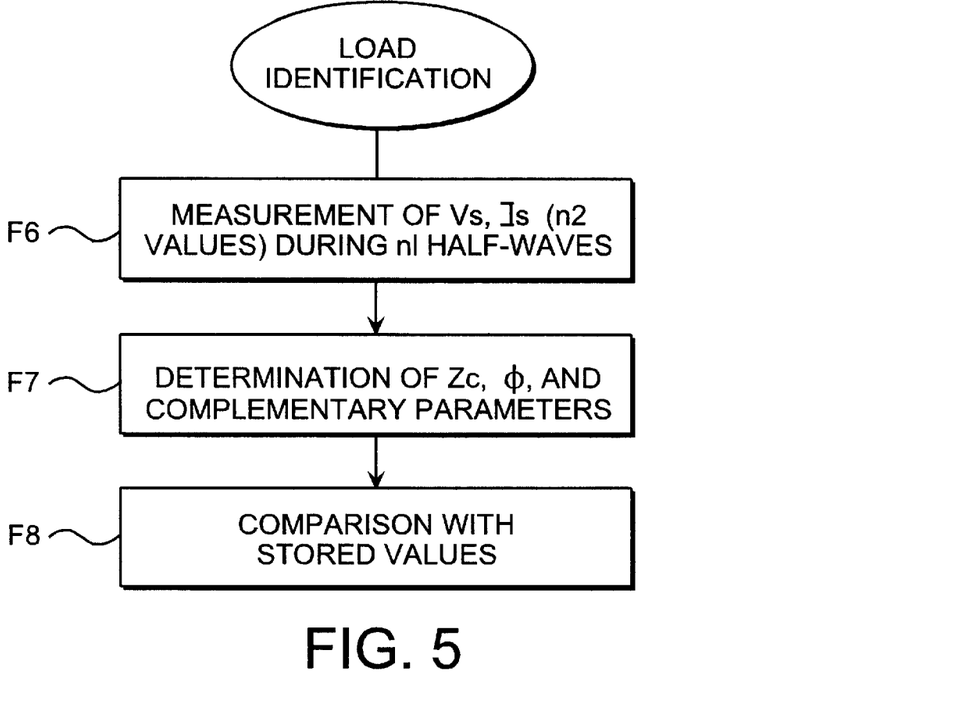
FIG. 5 represents a particular embodiment of the load identification stage of FIG. 2.
Figure 6:
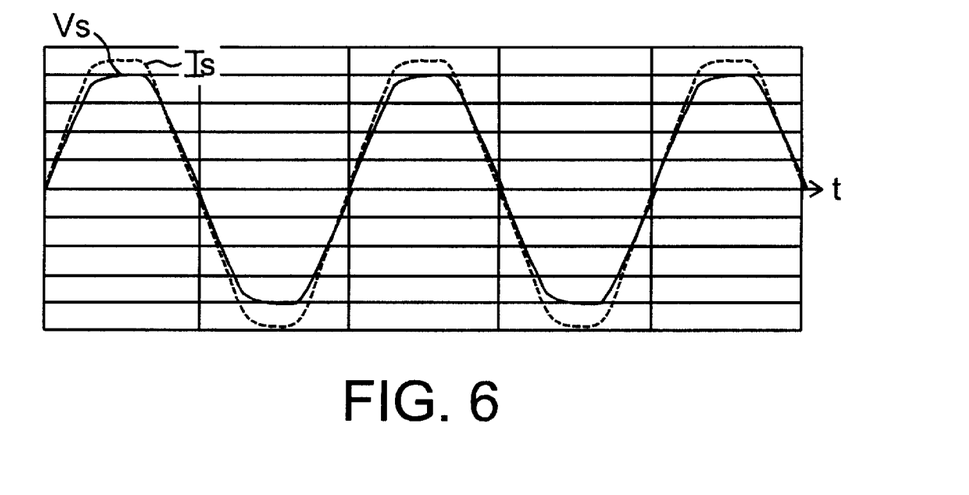
FIGS. 6 to 12 illustrate the variations of the voltage Vs and current Is in the load during 5 half-waves of measurement of the load identification phase, respectively, for a load constituted by a fluorescent bulb, a computer CPU, a dimmer, a motor, neons lights, a single-wave rectifying diode, and a transformer.
Figure 7:
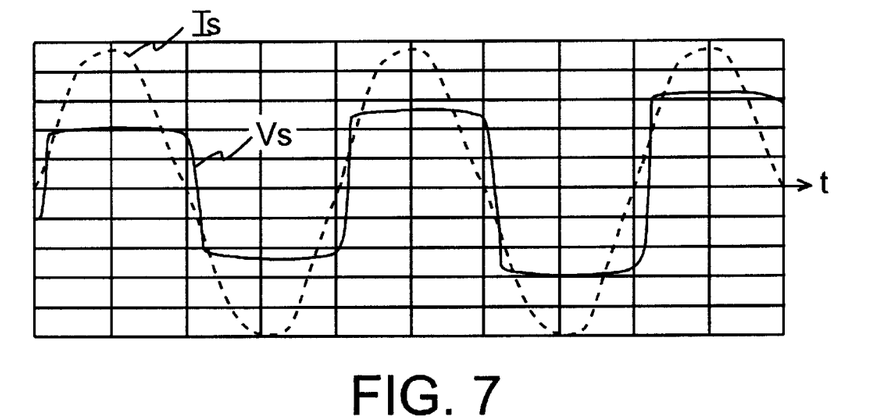
Figure 8:
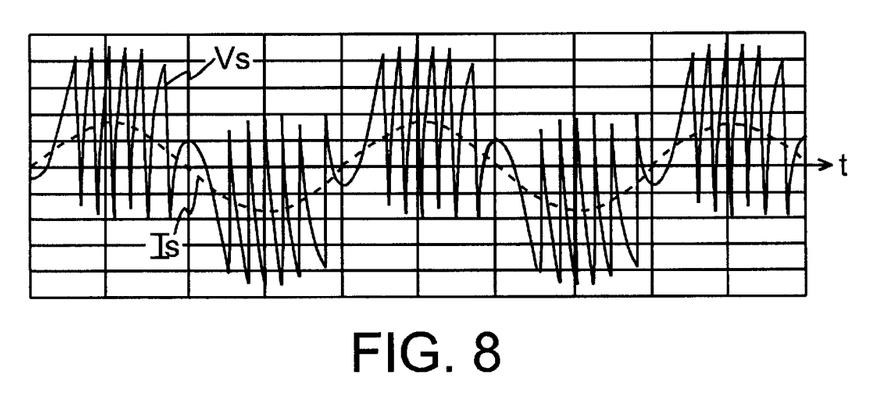
Figure 9:
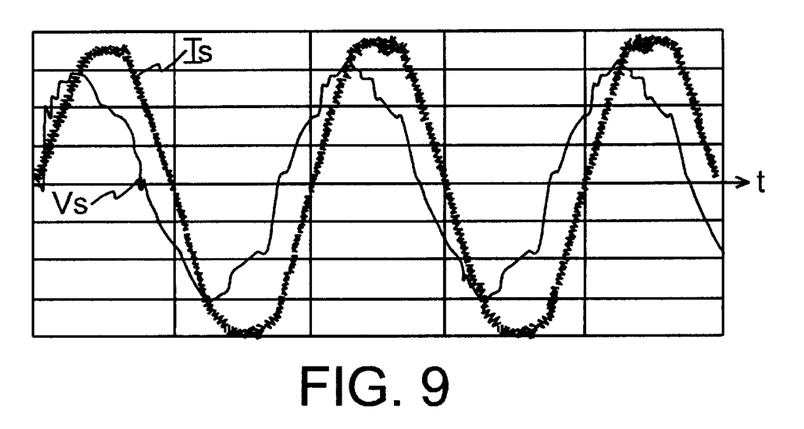
Figure 10:
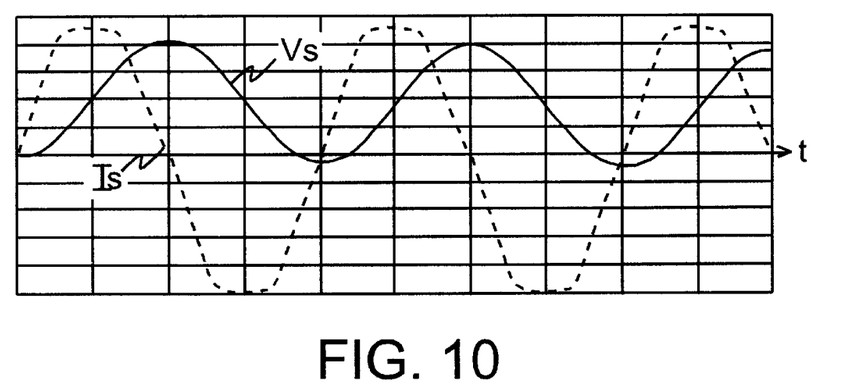
Figure 11:
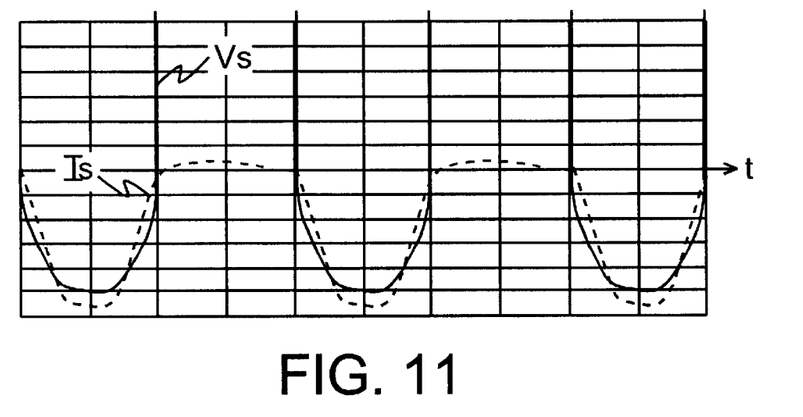

A particular embodiment of the load nature identification stage F5 is represented in FIG. 5. Throughout this stage, the state of the switches remains unchanged, that is to say, the switch 8 is closed and the switches 6 and 9 are open. The load 5, in series with the resistor R1 of high value, in supplied by the main power system voltage Vr under a low current. The current being limited to 5 mA, application of the main power system voltage to the load is not sufficient to start the latter, irrespective of its linearity.

In a stage F6, the control circuit 7 measures the instantaneous values of the output voltage Vs and of the current Is in the load during a limited number n1 of half-waves of the main power system voltage Vr. The number n1 is preferably about 4 or 5 half-waves. In FIG. 3, this stage, represented between the times t4 and t5, comprises 4 half-waves.

The number of instantaneous values of Vs and Is measured during each half-wave in a pro-determined number n2. In a preferred embodiment, 40 values of each quantity are measured and possibly stored during each half-wave. Although the voltage and current signals do no exactly reflect the nominal operation of the load, they are nevertheless characteristic of the electrical nature of the components of the load.

Likewise, the value of the load impedance Zc being able to be determined in the form of a mean value of the ratio of the voltage and current values measured in the stage F6 does not correspond to the nominal impedance of the load, but remains characteristic of its transient or cold impedance.

Moreover, the phase shift Ø between the current and voltage measured during the stage F6 makes it possible to determine whether the load Is essentially of resistive (zero phase shift), inductive, or capacitive nature.

These two quantities, Zc and phase shift Ø, are determined by the control circuit 7 during a stage F7 then compared (F8) with stored, pre-determined values representative of different types of load.

In the particular embodiment represented in FIG. 5, the control circuit in addition determines, during the stage F7, complementary parameters which are characteristic of the shape of the signals. These complementary parameters can, for example, be chosen from among the active power, the reactive power, the mean current and/or voltage values, the harmonic coefficients if an analysis of Fourier type is undertaken, the dissymmetry factors at the level of a half-wave, the evolution of the voltage during the first half-waves, criteria giving account of the square wave or triangle wave character or other character of the voltage, or an enumeration of the number of times one and/or the other of the waves measured when the phase passes zero.

The number of parameters used can be variable according to the precision or degree of identification required. It comprises, at least, the apparent load impedance and the phase shift between the current and voltage parameters.

Figure 12:
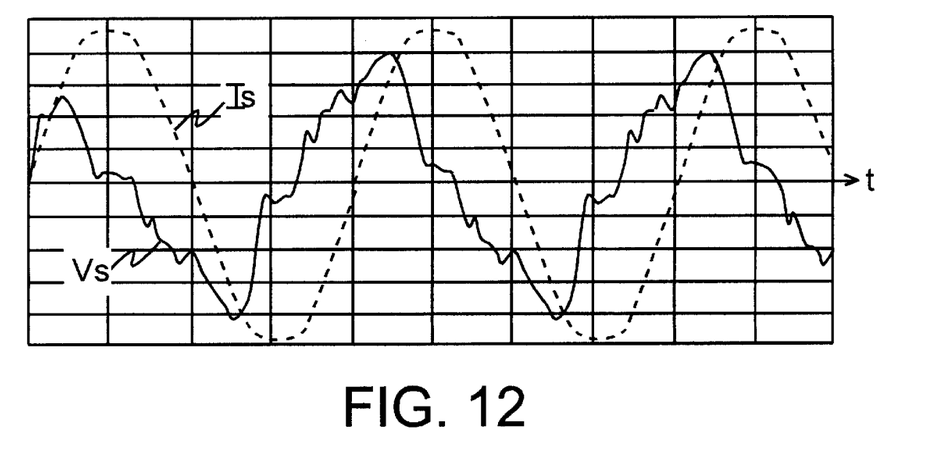

The set of parameters, described above, constitutes a signature for each type of load to be identified. FIGS. 6 to 12 illustrate the curves characteristic of Vs and Is, over 5 half-waves, for various types of usual loads, i.e., a resistance, for example, an incandescence bulb (FIG. 6) or a convector, a chopping power supply, for example, of the type encountered on a computer (FIG. 7) or any other electronic equipment, a dimmer, for example, a halogen lamp dimmer (FIG. 8), a motor, for example, of the domestic appliance type (FIG. 9), a fluorescent lamp, for example, a row of neon tubes (FIG. 10), a load comprising a half-wave rectifier device, for example, a hair drier at half power (FIG. 11), or a transformer (FIG. 12).

As an example, in the case of a motor (FIG. 9), the load is characterized, among other things, by a negative phase shift and by the presence of harmonic* giving the voltage wave a triangular shape. Furthermore, the measured impedance is linked to the nominal power of the apparatus. The value of the impedance can also serve the purpose of dissociating motors from loads comprising a power supply transformer. For usual household loads, the impedance of the transformers is, in fact, generally higher than the impedance of the motors.

In the case of a chopping power supply (FIG. 7), the capacitive nature of the load leads to a positive phase shift. Progressive charging of the capacitance through a rectifier bridge results in an increase of the peak or rms values of the voltage in the course of the first half-waves.

In the case of a load comprising a half-wave rectifier device (FIG. 11), the presence of a diode induces a current whose mean value in not zero. On the half-wave corresponding to the on state of the diode, the impedance is directly proportional to the nominal power of the load.

In the case of a fluorescent lighting system (FIG. 10), the latter is generally compensated by a capacitor whose value is a function of the nominal current. During the test phase, the tube is not powered and the circuit observed in mainly capacitive. It therefore results in a positive phase shift close to 90° (sinØ≈1). Charging of the capacitance from zero initial current and voltage conditions moreover results in a non-zero mean voltage value.

Purely resistive loads (FIG. 6) are characterized by a zero phase shift and the impedance observed is directly proportional to the nominal power. However, on account of the low energy involved, the first test phase does not enable heating resistances to be dissociated from the resistances corresponding to the filament of incandescence lamps, for example. This distinction can be made during a precise identification phase which will be described in greater detail later.

Other types of loads can be identified according to the same principle. For this, the complementary criteria which characterize them, as a complement to the impedance and phase shift, simply have to be known and taken into account by the control circuit 7 during the stages F7 and F8. This is, for example, the case of dimmer systems comprising a triac dimmer device (FIG. 8) which are characterized by a high impedance and which can present a high number of passages of the voltage at zero.

The use of the load impedance Zc and phase shift for identification of the nature of the load enables resistive, inductive and capacitive loads to be distinguished from one another. It also enables the difference to be made between a motor and a transformer, and also between a human body and other types of resistive loads.

Figure 13:
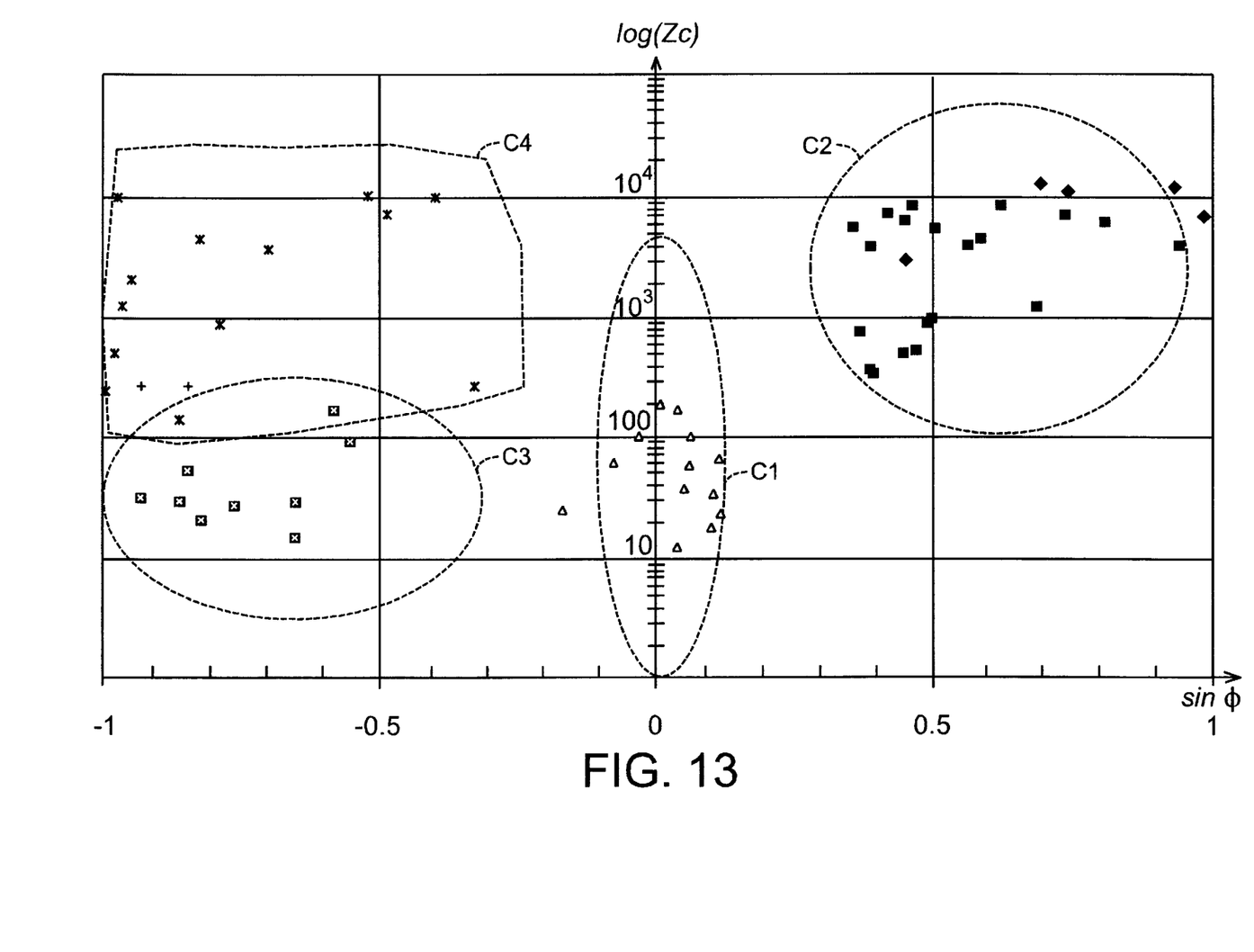
FIG. 13 illustrates, schematically, the values characteristic of the impedance and phase shift for different types of load.

FIG. 13, which represents log Zc as a function of sinØ, for different types of usual loads, enables these distinctions to be better understood. Indeed, in this figure, the points representative of resistances, represented by a triangle, are grouped in a zone C1, in which the phase shift is close to zero. The points representative of dimmers and chopping power supplies, respectively represented by diamonds and squares, are grouped in a zone C2, in which the phase shift is positive. The differences of impedance between these two types of capacitive load do not generally enable them to be distinguished and certain of the complementary parameters mentioned above are used for this purpose. For fluorescent tubes, the sinØ is close to 1.

The motors represented by the sign "X" are grouped in a zone C3, the transformers, represented by the sign "*", and the diodes represented by the sign "+" are grouped in a zone C4. The zones C3 and C4 are both representative of an inductive load, but for usual household loads, the impedance of the transformers is greater than that of the motors, which enables them to be distinguished.

Comparison of the impedances also enables the human body whose impedance is very high (considerably above the zone C1) to be distinguished from the other usual resistive loads which are in the zone C1.

Comparison of the different parameters to known values during the stage F8 can be performed by any known technique, notably by classification techniques. The control circuit 7 can thus use, for example, comparison algorithms with known loads or gradual methods, such as comparison with a pre-determined number K of the closest neighboring values.

The duration of the stages F7 and F8 depends on the processing capacity of the control circuit and of the number and precision of the parameters used for identification of the nature of the load. In FIG. 3, an additional computing and identification time has boon schematized between the times t5 and t6. It in preferable for this computing time to be less than a period of the main power system voltage, i.e., 20 ms for a 50 Hz main power system. Between those items t5 and t6, the mains system voltage can continue to be applied to the load 5 via the resistor R1, as during the first test phase I. The control circuit can also open the switch 8, thus interrupting all power supplied to the load.

After identification of the nature of the load (FIG. 2, F5), the control circuit advances to a second test, phase II (FIG. 3), during which the voltage pulses, of limited amplitude, are applied to the load. During phase II (stage F9), the control circuit keeps the switch 6 open (A1=0), closes the switch 9 (A3=1) and temporarily closes the switch 8 to apply the main power system voltage to the load for a pro-determined limited time of the cycle of Vr, so that the instantaneous voltage Vs applied to the load remains lower than a pre-determined peak voltage Vp and much lower than the peak voltage of the main power system. In this way, the load 5 remains supplied during this phase under low power. For this, the control signals A2 are logic signals which command closing of the switch 8 with a pre-determined phase shift with respect to the passage of the mains power system voltage Vr at zero.

To ensure synchronization of the signals A2 on the main power system voltage, the latter is applied to an input of the control circuit 7 (FIG. 1).

Figure 14:
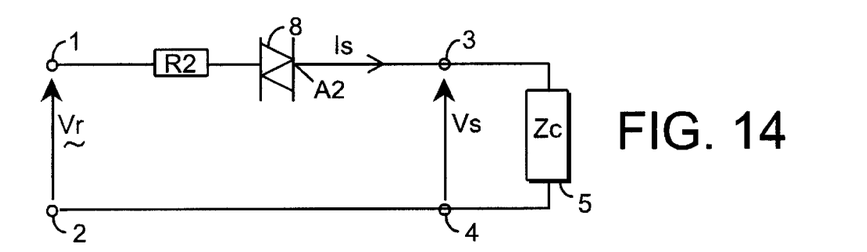
FIG. 14 represents an equivalent wiring diagram of the device, according to the invention, during the second test phase.

FIG. 14 represents the equivalent wiring diagram of the circuit during the second test, phase II. The third switch 9 being closed, the resistor R1 is connected in parallel with the assembly formed by R2 and the switch 9. However, the respective values of R1 and R2 are such that the resistor R1 does not play any role and can be ignored. As a non-restrictive example, R2 is about 1 ohm.

Figure 15A:
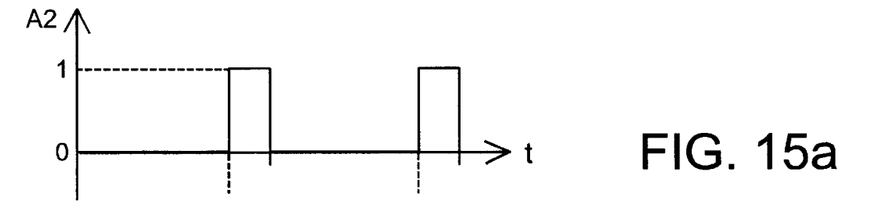
FIGS. 15A and 15B illustrate, respectively, the wave forms of the control signals A2 of the electronic switch and the voltage Vs applied to the load during the second test phase in the device, according to FIG. 14.
Figure 15B:
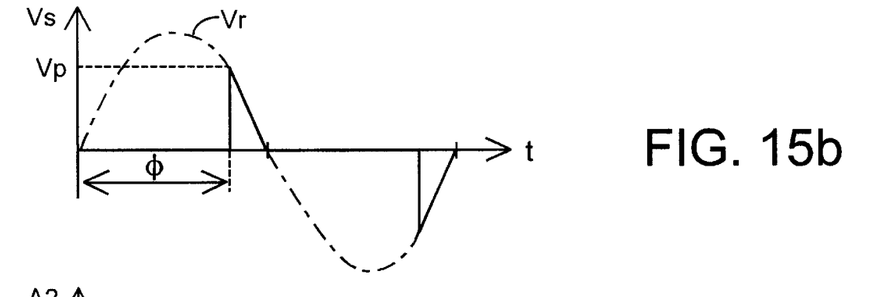

In the case of a triac 8, the signals A2 are preferable as represented in FIG. 15A, which supplies output signals Vs as represented in FIG. 15B. In FIG. 15B, the main power system voltage Vr is represented by a broken line. A pulse A2 of logic value 1 is applied to the control electrode of the triac 8 with a phase shift Ø with respect to each passage of the main power system voltage Vr at zero. The triac 8 is therefore on for a short time of each half-wave, between application of the pulse A2 and the next passage of Vr at zero, the instantaneous voltage Vs remaining, in absolute value, lower than the peak voltage Vp (FIG. 15B).

For an rms value of 230V of the main power system voltage Vr, the peak voltage Vp in preferably lower than 50V. In a preferred embodiment Vp=20V. The phase shift angle Ø can then be calculated by the equation:

$$Vp = 230\sqrt{2} \sin Ø,$$

i.e., Ø=176°, which for a main power system frequency of 50 Hz corresponds to a phase shift of 9.8 ms. As an example, if Vp=20V, the current in the triac is limited to 20A in case of a short-circuit if the protective resistance is 1 ohm.

Figure 16A:
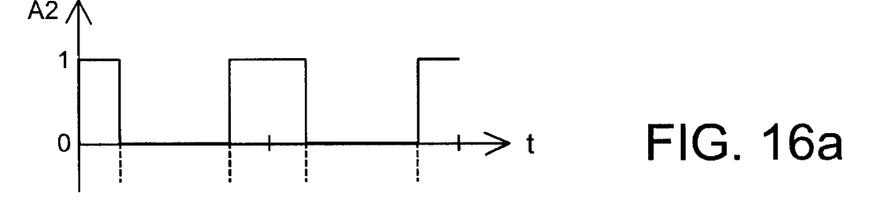
FIGS. 16A and 16B illustrate, respectively, alternate forms of the signals A2 and Vs when the electronic switch is of the type represented in FIGS. 17 and 18.
Figure 16B:
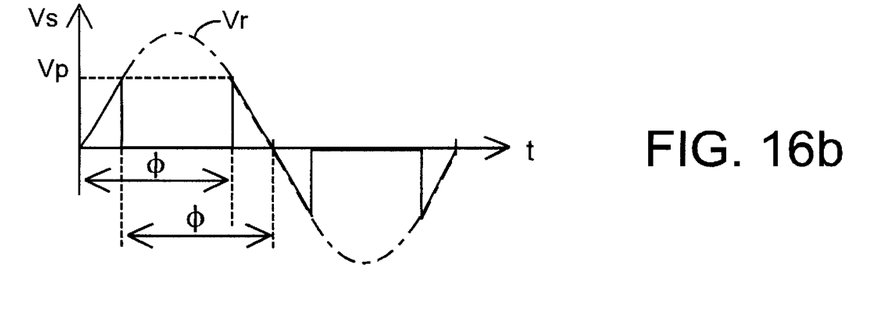
Figure 17:
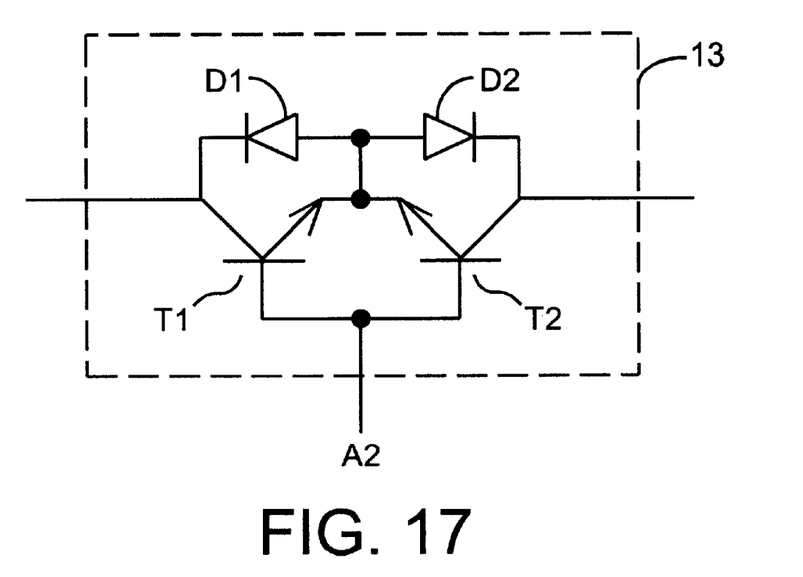
FIGS. 17 and 18 represent two other particular embodiments of the electronic switch of the device, according to FIG. 1.

In the embodiment of FIGS. 15A and 15B, at each period of Vr, two fractions of a sine wave of opposite signs are applied to the load. This is justified in the presence of asymmetric loads. Moreover, if the electronic switch is achieved with transistors, an in FIGS. 17 and 18, which will be described in greater detail below, the signals A2 can be of the type represented in FIG. 16A. In this case, A2 takes, as before, the logic value 1 after a phase shift Ø. However, the switch does not open automatically when the main power system voltage passes zero; but its opening, or turn-off, is controlled by switching to logic value zero, preferably with the same phase shift Ø with respect to the next passage of Vr at zero. The wave form represented in FIG. 16B is thus obtained for Vs.

The triac of FIGS. 1 and 14 can be replaced by any other suitable electronic switch. A particular embodiment of the switch 8 in represented by the electronic switch 13 of FIG. 17. It is formed by two transistors T1 and T2 whose emitters are connected to a common point and whose bases are connected to form the control electrode of the switch, receiving the control signals A2. The collectors of T1 and t2, respectively, constitute the input and output of the electronic switch 13. The anodes of the diodes D1 and D2 are connected to the emitters of T1 and T2, whereas their cathodes are respectively connected to the collectors of T1 and T2.

Figure 18:
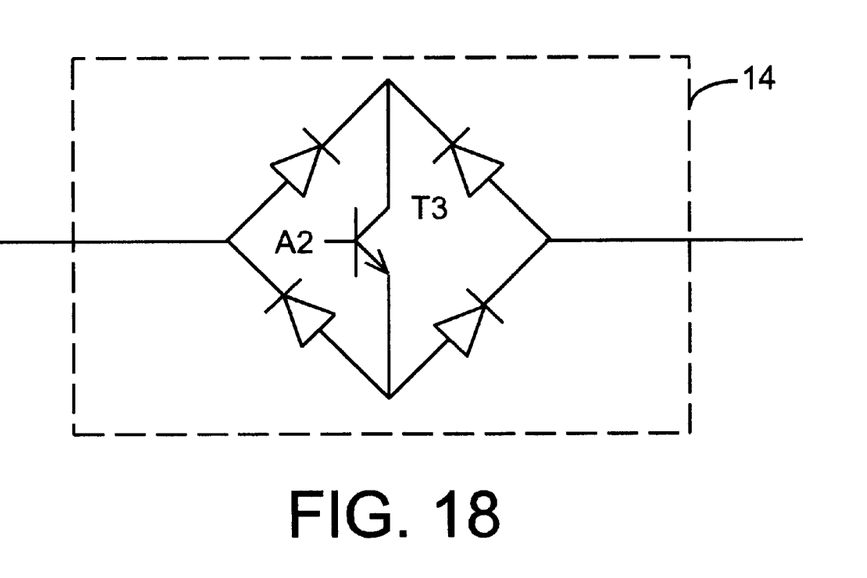

Another particular embodiment of the switch 8 is represented by the electronic switch 14 of FIG. 18. It is formed by a diode bridges one diagonal of which in connected between the input and output of the switch. A transistor T3, whose base receives the control signals A2, is connected in the other diagonal of the diode bridge.

During the second test, phase II (FIG. 3), the stage F9 (FIG. 2) in followed by a stage F10 of measurement of the current Is, the voltage Vs and the differential current Id. The stage F10 can be followed by a stage F11 of precise identification of certain load. The control circuit then goes on to a short-circuit detection stage F12. In the absence of a short-circuit (no output of F12), the control circuit continues its test program. If, on the other hand, a short-circuit is detected (yes output of F12), then the control circuit goes on to a fault indication stage F13, signaling the short-circuit before returning to the stage F1. If no short-circuit is detected (no output of F12), the control circuit goes on to a differential fault detection stage. If a differential fault is detected (yen output of F14), the control circuit goes to the fault indication stage F13, signaling the differential fault before returning to the stage F1. if there is no differential fault (no output of F14), the control circuit goes on to an overload detection stage F15. If an overload is detected (yes output of F15), it goes to the fault indication stage F3, signaling the overload. If not (no output of F14), it goes on, possibly via a progressive startup phase, to a permanent operation phase F17 (phase III of FIG. 3). During the progressive startup phase, the control circuit perform progressive closing of the switch 6 suitable for the type of load detected. During the stage F17 the mains system voltage of Vr is applied continuously to the load 5 via the first switch 6 (A1=1, A2=A3=0).

Figure 19:
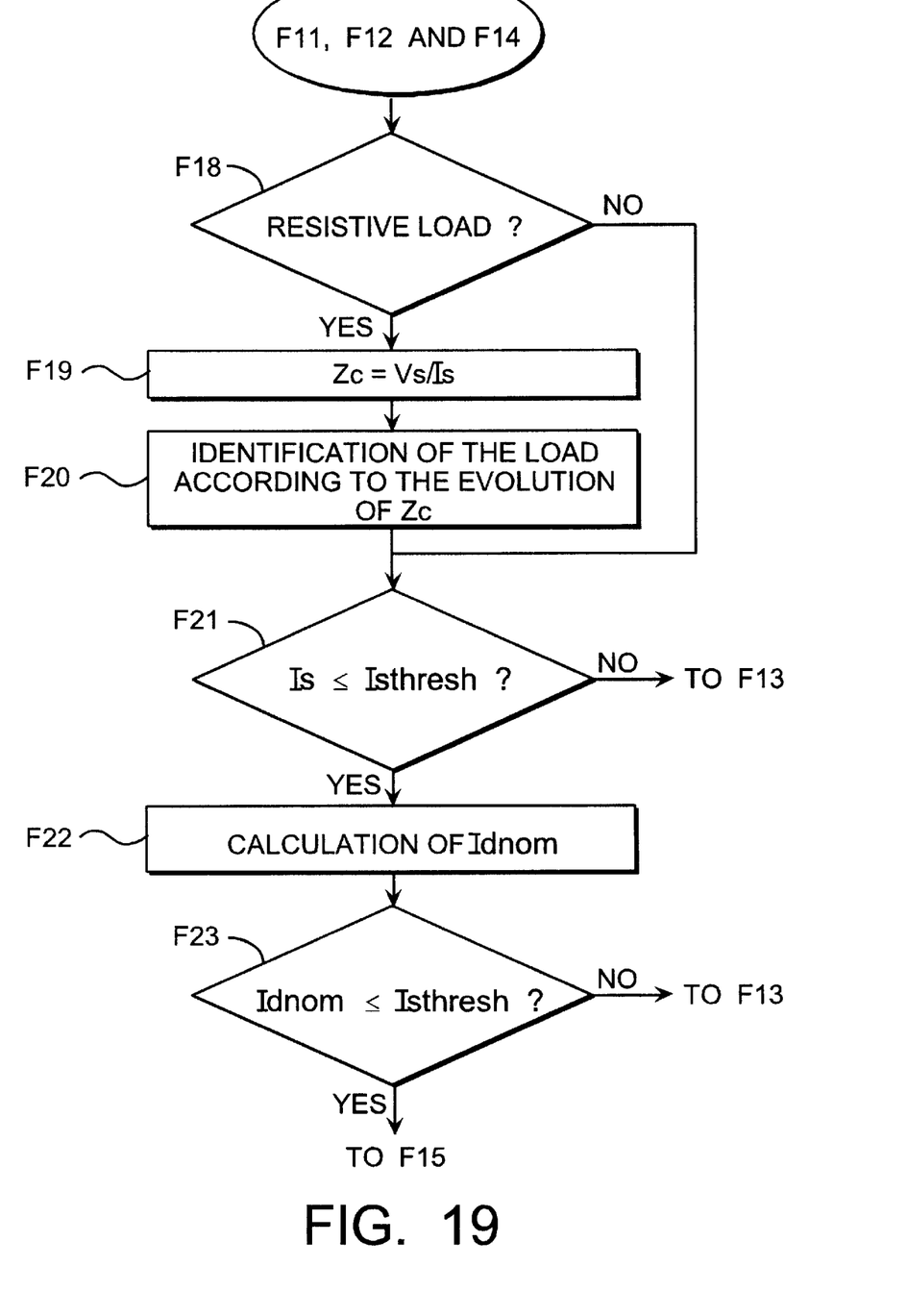
FIG. 19 represents a particular embodiment of the stages F11 of precise identification, F12 of short-circuit detection and F14 of differential fault detection of FIG. 2.

In the particular embodiment of stages F11, F12, and F14, represented in FIG. 19, precise identification of the type of load is performed in the case of resistive loads. Indeed, as indicated above, the first test phase does not enable the distinction to be made between pure resistances and resistances corresponding to the filament of an incandescence lamp, for example. The second test phase, during which the load is supplied under a reduced voltage, but without current limiting, enables such a distinction to be made. In a stage F18, the control circuit chocks whether the load is of the resistive type. If it is (yes output of F18), it performs precise identification. To do this, it determines (F19) the load impedance Zc=Vs/Is during the second test phase, then identifies the load according to the evolution of Zc. The power involved being in fact greater than that involved in the first test phase, the impedance of a bulb increase, whereas the impedance of pure resistances remains unchanged.

After a stage F20, or after the stage F18, if the load is not resistive, the short-circuit detection stage can be performed (F21) by comparing Is with a current threshold Isthresh. If the current Is is lower than or equal to the current threshold, this is interpreted as an absence of short-circuit and the control circuit continues its test program. If, on the other hand, Is is greater than the current threshold, then (no output of F21) the load is considered as presenting a short-circuit. The control circuit then goes on to the fault indication stage F13.

As an example, 5 ohms can be taken as the limit short-circuit resistance for the load, which corresponds to a power greater than 10 kW. In this case, the short-circuit detection current threshold in given by the equation:

$$I\text{sthresh}=Vp/(R\text{short-circuit}+R2)$$

$$I\text{sthresh}=20/(5+1)=3.3A.$$

For detection of a differential fault, it is considered that a differential fault current varies linearly with the voltage applied and consequently that the differential current under-rated voltage can be estimated by a measurement under reduced voltage.

Measurement of the differential current having been performed in stage F10, in the particular embodiment of FIG. 19 the control circuit calculates the differential current Idnom underrated voltage during a phase F22 and compares Idnom with a differential current threshold Idthresh during a phase F23. If Idnom is lower than or equal to the threshold Idthresh, the control circuit considers that there is no differential fault and continues its test program. If, on the other hand, Idnom is greater than the threshold Idthresh, then (no output of F23) a differential fault in detected and the control circuit goes to the fault indication stage F13, signaling a differential fault. As an example, with the assembly of FIGS. 14 and 19, for a load of 10 kW, i.e. 5 ohms, the maximum voltage Vp at the terminals of the load is given by (20×5)/(5+1)=16.7V. The differential current under rated voltage (230V) in given by: Idnom=230Id. The protection threshold Idthresh is, for example, set at 30 mA.

Instead of using the measurements of Is and Id directly for detection of a short-circuit or a differential fault, it is possible to use the corresponding values of the load impedance calculated from measured values of Is, Vs, and Id. This notably means that possible variations of the main system voltage amplitude do not have to be taken into account.

Figure 20:
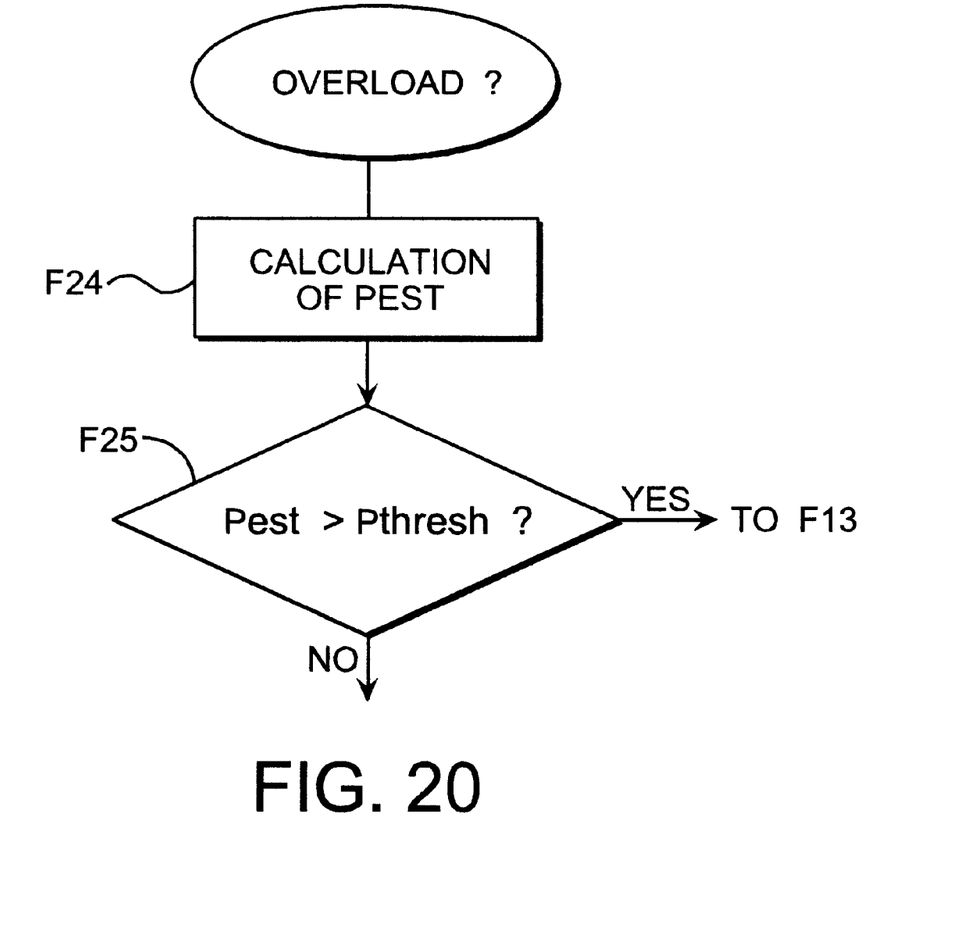
FIG. 20 represents a particular embodiment of the overload detection stage of FIG. 2.

For preventive detection of a possible overload (F15, FIG. 2), the control circuit takes account of the nature of the load which has just been identified. As represented in FIG. 20, detection of the overload begins with a stage F24 in which the estimated rated power Pest of the load is calculated. Then, in a stage F25, it compares Pest with a pre-determined power threshold Pthresh which corresponds to the nominal power available on output of the device, stored in the control circuit. If the estimated power is greater than the power threshold, the control circuit considers there is an overload. If not (no output of F25), it goes from the time t8 (FIG. 3) to the permanent operation stage F17, possibly after a progressive startup stage F16 (FIG. 2).

The estimation of the nominal power of the load is adapted to suit the type of charge, previously identified by the control circuit. The estimation in made from measurements of the current Is and voltage Vs performed during the preceding stages. The nature of the load determines the measurements able to be used.

In the convector, the impedance of the load is constant and identical under both hot and cold conditions. The rated voltage Vr of the main power system (e.g., 230V) being known, the nominal power can be calculated from the value R of the resistance (impedance Zs) calculated (F7, FIG. 5) from measurements made (at F6) during the load identification phase. The value of the resistance R of the convector can also be possibly obtained at F19 (FIG. 19) from the measurement at (F10) of the current Is made during the second test phase. Pest is given by: Pest=$Vr^2$/R.

In the case of an incandescence bulb, the estimated nominal power is about ⅓ of the cold power Pc, i.e., Pest=Pc/13=$Vr^2$/(13Rc), where Rc represents the cold resistance of the filament of the bulb. The value of Rc can be calculated (F7, possibly F19) from the measurements made at F6 during the first test phase or at F10 during the second test phase.

In the case of a fluorescent lamp, for example, a neon tube, the latter is generally compensated by a capacitor whose value depends on the rate current. During the second test phase, the tube is not powered and the current Is measured during the stage F10 is mainly the capacitive current. This enables a measurement Zc of the cold impedance to be obtained. The estimated nominal power Pest is then calculated from Zc:

$$\text{Pest} \approx Vr^2/Zc = (230)^2/Zc$$

In the case of a motor, calculation of the nominal power is performed from the power measured cold in the course of the first test phase.

As an example, the adapted progressive startup may consist of a phase command by a triac for an inductive load or of a command by phase interruption for a capacitive load.

The duration of the stages F11, F12, F14, and F15 depend on the processing capacities of the control circuit. In FIG. 3, an additional processing period has been schematized between the times t7 and t8 at the end of the second test, phase II, which preferably lasts for two periods of Vr. It is preferable that this computing time be an short as possible. During this processing period, the control circuit can interrupt all power being supplied to the load. In a preferred embodiment, detection of power-on of a load, its identification and preventive fault detection are performed in less than 200 ms.

Preventive fault detection, notably of a differential, short-circuit or overload fault, before application of a rated main power system voltage to a load, reduces the number of operations of a breaking device located up-line and designed to perform protection of the main power system and/or load in permanent operation, i.e., to perform selectivity of the assembly and reduce the wear of the breaking device. In addition, this improves the safety of an electrical device with respect to people and equipment. It also makes automatic re-closing of a breaking apparatus equipped with such a device possible, which enables a better continuity of service to be achieved.

Figure 21:
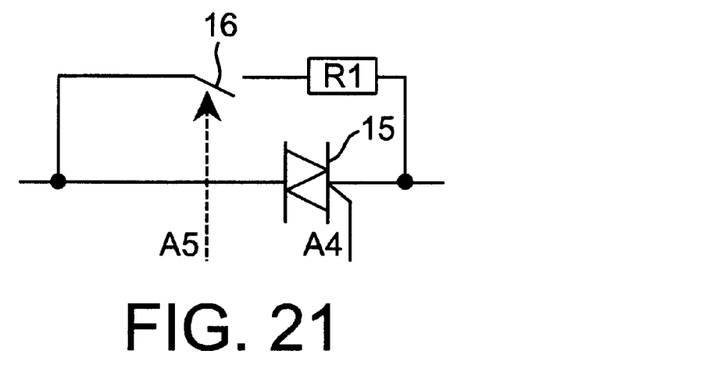
FIGS. 21 to 23 illustrate alternative embodiments of the switching circuit of the device, according to FIG. 1.

The invention is not limited to the switching circuit of the device represented in FIG. 1. In a first alternative embodiment, represented in FIG. 21, an electronic switch 15, formed, for example, by a triac, controlled by control signals A4 from the control circuit 7, is connected between the terminals 1 and 3 in parallel with a switch 16, controlled by control signals A5 and connected in series with the resistor R1. During the first test phase A4 equals 0 and A5 equals 1, to supply the load 5 under a low current condition. Then, during the second test phase, A4 equals 1 with the phase shift Ø and A5 equals 0, to apply pulses limited in voltage to the load. In permanent operation, A4 equals 1 and A5 equals 0. A switching circuit of this kind can be used provided that the electronic switch 15 can withstand the main power system voltage.

Figure 22:
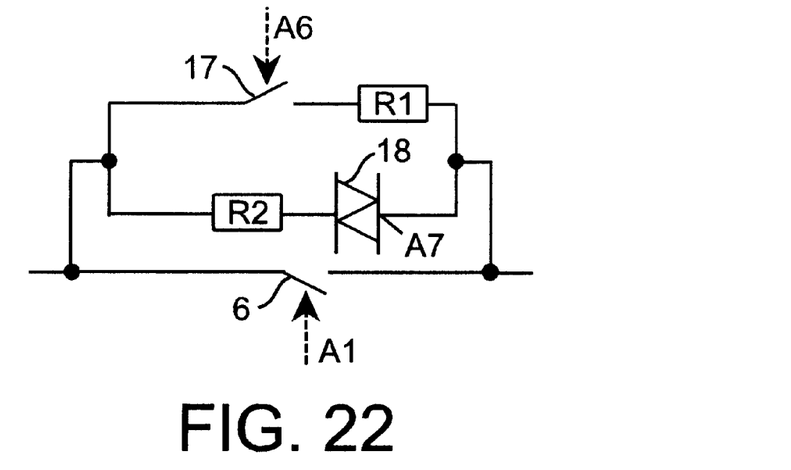

In a second alternative embodiment, represented in FIG. 22, the switching circuit comprises, as in FIG. 1, a first switch 6 controlled by the signals A1. The first switch 6 is connected in parallel with a switch 17 in series with the resistor R1, the switch being controlled by signals A6. A series circuit formed by an electronic switch 18 in series with the resistor R2 is also connected in parallel with the switch 6. Control signals A7 control the switch 18. During the first test phase, A1 equals A7 equals 0 and A6 equals 1, whereas during the second test phase, A1 equals A6 equals 0 and A7 equals 1 with the phase shift Ø. In permanent operation, A1 equals 1 and A6 equals A7 equals 0.

Figure 23:
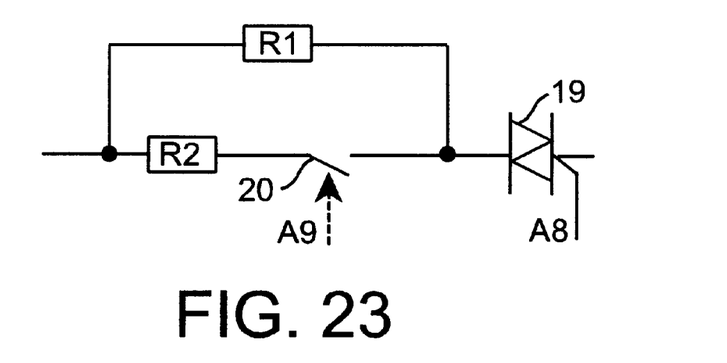

In a third alternative embodiment, represented in FIG. 23, an electronic switch 19, controlled by control signals A8, is connected in series with an additional switch 20, controlled by signals A9, between the terminals 1 and 3. A resistor R2 of low value may be connected in series with the additional switch 20. The resistor R1 is connected in parallel with the assembly R2 and switch 20. During the first test phase A8 equals 1 and A9 equals 0, whereas during the second test phase A8 equals 1, with the phase shift Ø, and A9 equals 1. In permanent operation, A8 equals A9 equals 1.

In all the embodiments represented above, the switching means, connected between the terminals 1 and 3, comprise connecting means (8, 16, 17, 19) to connect the load to the main power system via the limiting resistor R1 of high value during the first test phase. They also comprise an electronic switch (8, 15, 18, 19) able to be closed temporarily during the second test phase to apply the main power system voltage to the load during a limited duration of the cycle of Vr.

The switches (6, 9, 16, 17, 20) which are not represented in electronic form can be formed by mechanical contacts or by switches of electronic type.

What is claimed is:

1. A device for preventive detection of faults in a load connected to an AC electrical power supply system comprising:

switching means comprising a first switch for connecting a load to an AC electrical power supply system, a second switch for connecting said load to said AC electrical power supply system via a limiting impedance having a high value; and, control means for controlling said switching means, said control means for closing the second switch during a first test phase and comprising means for identifying a type of load comprising means for measuring a pre-determined number of sample values of an instantaneous current and voltage in said load during a plurality of half-waves of a full cycle of an AC signal voltage of the AC electrical power supply system wherein said pre-determined number of sample values are several tens of values for each half wave, means for determining a current/voltage phase shift in the load, means for calculating a load impedance from measured sample values of instantaneous currents and voltages and means for comparing the current/voltage phase shift in the load and impedance with pre-determined values representative of different types of loads.

2. The device according to claim 1, wherein the limiting impedance is a resistor.

3. The device according to claim 1, wherein the means for identifying the type of load comprises means for determining from the measured instantaneous voltages and currents, complementary electrical parameters of the load, and means for comparing the complementary parameters with predetermined values representative of different types of load.

4. The device according to claim 3, wherein the complementary parameters are chosen from among an active power, a reactive power, a mean current and/or voltage values, harmonic coefficients, dissymmetry factors at a level of a half-wave of a full cycle, evolution of an AC signal voltage in the course of the first half-waves, the form of voltage, and number of times the current and/or voltage passes zero.

5. The device according to claim 1, wherein the switching means comprise a first electronic switch and, during a second test phase, the control means temporarily close the electronic switch to apply the AC voltage of the AC electrical power supply system to the load during a limited period of the AC electrical power supply system voltage cycle, so the instantaneous voltage applied to the load remains, during the second test phase, lower than a predetermined peak voltage that is much lower than a peak voltage of the AC electrical power supply system.

6. The device, according to claim 5, wherein the type of load detected being a resistive load, the means for identifying the type of load comprise means for determining the load impedance during the second test phase and means for precise determination of the type of resistive load.

7. The device according to claim 5, wherein the means for detecting faults comprises means for detecting a short-circuit that comprises means for comparing current measured in the load during the second test phase with a predetermined current threshold, and means for signaling a short-circuit if the current measured exceeds said current threshold.

8. The device according to claim 5, wherein the means for detecting faults comprise means for detecting a differential fault comprising means for measuring the differential current during the second test phase, means for comparing the differential current with a predetermined differential current threshold, and means for signaling a differential fault if the differential current measured exceeds the differential current threshold.

9. The device according to claim 5, wherein an electronic switch constitutes the first switch.

10. The device according to claim 5, wherein an electronic switch is connected, in series with a protective resistor of low value, in parallel with the first switch.

11. The device according to claim 5, wherein the first switch comprises an electronic switch in series with an additional switch open during the first test phase and closed during the second test phase, the limiting impedance of high value being connected in parallel with the additional switch.

12. The device according to claim 1, wherein the means for detecting faults comprise means for detecting an overload comprising means for estimating the nominal power of the load adapted to the type of load detected, means for comparing the estimated nominal power with a predetermined power threshold representative of the power available on output of the device, and means for signaling an overload if the estimated nominal power exceeds the power threshold.

13. The device according to claim 1, comprising means for detecting the presence of a load during the first test phase, said means comprising means for comparing the output voltage with a predetermined voltage threshold, the control means performing identification of the type of load and fault detection when the output voltage is lower than or equal to said voltage threshold.

14. The device according to claim 1, wherein the control means perform progressive closing of the first switch adapted to the type of load detected when no fault has been detected.

15. The device according to claim 1, wherein the connecting means comprise a switch connected, in series with the limiting impedance of high value, and in parallel with the first switch.

16. The device according to claim 15, wherein the switch of the connecting means is an electronic switch, the limiting impedance being connected in parallel with a circuit formed by a protective resistor of low value connected in series with an additional switch closed during the second test phase.

17. The device according to claim 1, wherein the number of half-waves used for identification of the load during the first test phase is 4 or 5.

18. The device according to claim 1, wherein the number of current and voltage values measured for identification of the load during the first test phase is about 40.

* * * * *